United States Patent
Froeschle et al.

(10) Patent No.: US 8,794,691 B2
(45) Date of Patent: Aug. 5, 2014

(54) FOLDING TOP

(71) Applicant: Dr. Ing. h.c.F. Porsche Aktiengesellschaft, Stuttgart (DE)

(72) Inventors: Mathias Froeschle, Ostfildern (DE); Timo Czechtizky, Zell u. A. (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 13/923,802

(22) Filed: Jun. 21, 2013

(65) Prior Publication Data

US 2014/0008934 A1    Jan. 9, 2014

(30) Foreign Application Priority Data

Jul. 5, 2012 (DE) .................... 10 2012 106 026

(51) Int. Cl.
 *B60J 7/08* (2006.01)
(52) U.S. Cl.
 USPC ............................................. 296/108
(58) Field of Classification Search
 USPC ............. 296/108, 107.01, 107.04, 107.07, 296/107.08, 107.09, 107.11, 107.12, 296/107.16, 116, 118, 121, 122, 107.15, 296/111, 117, 219
 See application file for complete search history.

(56) References Cited

U.S. PATENT DOCUMENTS

| | | | | |
|---|---|---|---|---|
| 2,895,764 A | * | 7/1959 | Himka et al. | 296/117 |
| 3,053,567 A | * | 9/1962 | Geiger | 296/107.08 |
| 3,170,726 A | * | 2/1965 | Lystad | 296/136.06 |
| 4,529,243 A | * | 7/1985 | Kaltz et al. | 296/121 |
| 4,537,440 A | * | 8/1985 | Brockway et al. | 296/108 |
| 5,067,768 A | * | 11/1991 | Fischbach | 296/107.08 |
| 5,225,747 A | * | 7/1993 | Helms et al. | 318/265 |
| D391,547 S | * | 3/1998 | Lehmann et al. | D12/401 |
| 5,765,904 A | * | 6/1998 | Aydt et al. | 296/107.12 |
| 5,903,119 A | * | 5/1999 | Laurain et al. | 318/265 |
| 5,921,608 A | | 7/1999 | Schmitt et al. | |
| 5,998,948 A | * | 12/1999 | Lange et al. | 318/280 |
| 6,039,382 A | * | 3/2000 | Mather et al. | 296/107.01 |
| 6,114,819 A | * | 9/2000 | Porter et al. | 318/466 |

(Continued)

FOREIGN PATENT DOCUMENTS

| | | |
|---|---|---|
| DE | 195 38 738 | 1/1997 |
| DE | 197 13 710 | 10/1998 |

(Continued)

OTHER PUBLICATIONS

German Search Report of Mar. 27, 2013.

*Primary Examiner* — Kiran B Patel
(74) *Attorney, Agent, or Firm* — Gerald E. Hespos; Michael J. Porco; Matthew T. Hespos

(57) ABSTRACT

A double buttress folding top has rear-side tensioning bows with two rearwardly directed U-shaped sections that are connected to each other via a central bow section. The tensioning bows tension the folding top cloth in the region of the buttresses. The folding top cloth is fastened to the tensioning bow. The tensioning bow bears from below against a folding top compartment cover and against edges of lateral body cutouts. The folding top compartment cover therefore has two lateral cutouts which, in the open position of the folding top, are closed by lateral flaps. The tensioning bow is of U-shaped design and, above a rear window, has a bow web to which the rear window is coupled in a hinged or pivotable manner.

6 Claims, 3 Drawing Sheets

(56) References Cited

U.S. PATENT DOCUMENTS

| | | | | |
|---|---|---|---|---|
| 6,155,614 | A * | 12/2000 | Lange | 292/113 |
| 6,237,986 | B1 * | 5/2001 | Neubrand et al. | 296/107.01 |
| 6,270,143 | B1 * | 8/2001 | Heselhaus et al. | 296/107.01 |
| 6,299,233 | B1 * | 10/2001 | Mentink | 296/107.09 |
| 6,695,385 | B1 * | 2/2004 | Lange | 296/107.12 |
| 6,796,595 | B2 * | 9/2004 | Doncov | 296/107.09 |
| 6,871,899 | B2 * | 3/2005 | Mandl et al. | 296/107.12 |
| 6,902,223 | B2 * | 6/2005 | Hollenbeck et al. | 296/107.09 |
| 6,957,842 | B1 * | 10/2005 | Garska | 296/107.12 |
| 7,021,696 | B2 * | 4/2006 | Doncov et al. | 296/121 |
| 7,857,373 | B2 * | 12/2010 | Dilluvio et al. | 296/107.09 |
| 8,025,328 | B2 * | 9/2011 | Dilluvio et al. | 296/109 |
| 8,052,197 | B2 * | 11/2011 | Kasperowski et al. | 296/107.17 |
| 8,287,028 | B2 * | 10/2012 | Baumgart et al. | 296/107.17 |
| 2003/0234553 | A1 * | 12/2003 | Doncov | 296/107.09 |
| 2007/0063533 | A1 * | 3/2007 | Zehnder et al. | 296/118 |
| 2008/0238132 | A1 * | 10/2008 | Dietl | 296/108 |

FOREIGN PATENT DOCUMENTS

| | | |
|---|---|---|
| DE | 10 2004 004 467 | 8/2005 |
| DE | 10 2007 008 397 | 8/2008 |
| DE | 10 2009 035 030 | 2/2011 |
| FR | 2 897 585 | 8/2007 |

* cited by examiner

FOLDING TOP

CROSS REFERENCE TO RELATED APPLICATION

This application claims priority under 35 USC 119 to German Patent Appl. No. 10 2012 106 026.6 filed on Jul. 5, 2012, the entire disclosure of which is incorporated herein by reference.

BACKGROUND

1. Field of the Invention

The invention relates to a folding top for a passenger vehicle.

2. Description of the Related Art

DE 197 13 710 A1 discloses a folding top for a passenger vehicle with a folding top linkage and a foldable folding top cloth that is supported by the folding top linkage. The folding top is shiftable from a closed position into a storage position in which the folding top is accommodated in a receiving space covered by a folding top compartment cover. The folding top compartment cover has two lateral, longitudinally directed, raised buttresses, and a section of an engine hood is arranged between the buttresses. Furthermore, DE 10 2004 004 467 A1 discloses a vehicle with a double buttress folding top that has a corner bow to form the frame of a rear window. A folding top compartment cover is sealed against the rear window when the roof arrangement is in the closed position. Molded bodies mounted on the corner bow are provided for shaping the buttresses.

It is the object of the invention to provide a folding top for a motor vehicle with buttresses arranged on the rear side of the vehicle and that are positionable in a simple manner in a closed position and a storage position.

SUMMARY OF THE INVENTION

The invention relates to a folding top for a motor vehicle. The folding top has buttresses, which, in the closed position of the folding top, can be brought into shape via tensioning of the folding top and/or via cable tensioning above the folding top compartment cover and can be put away in a simple manner into a storage position in the receiving space of the vehicle together with the folding top.

The folding top has raised buttresses that are oriented longitudinally in the region to the sides of a rear window when the folding top is in the closed position. The raised buttresses are held by two rearwardly directed, U-shaped bow sections of a transversely lying tensioning bow. The tensioning bow engages over the rear window from above by means of an upright, U-shaped section with a bow web. The bow sections are mounted in a lateral cutout of the folding top compartment cover so as to bear on the lower side against a wall of the folding top compartment cover. The transversely lying tensioning bow with the rearwardly directed bow sections tensions the buttresses, and the adjoining, upright, U-shaped section of the tensioning bow holds the rear window via the bow web arranged on the upper edge.

The folding top compartment cover has lateral cutouts of on both sides and each have a pivotable flap. The cutouts are released in the closed position of the folding top, and the cutouts are closed via the flaps in the storage position of the folding top. The pivotable flaps on the folding top compartment cover enable the tensioning bow to be moved up from the storage position into the closed position and the cutouts to be sealed in the open position or storage position of the folding top.

The rear window preferably is hinged on the transversely extending upper bow web of the tensioning bow and has a horizontal position in the storage position. This pivotable arrangement of the rear window on the tensioning bow or on the transversely extending bow web simplifies the putting away into the receiving space and saves space.

A sealing element preferably is provided on the lower edge of the rear window in relation to the folding top compartment cover to ensure sealing between the rear window and the folding top compartment cover in the closed position of the folding top.

The folding top is lowerable from the closed position into the storage position and is transferrable into the receiving space of the vehicle. The rear window then takes up the horizontally hinged-down position, and the lateral cutouts of the folding top compartment cover are closable via the flaps. Thus, the closed and storage positions of the folding top can be obtained in a simple manner.

An exemplary embodiment of the invention is illustrated in the drawings and is described in more detail below.

DETAILED DESCRIPTION OF THE PREFERRED EMBODIMENTS

Figure 1:
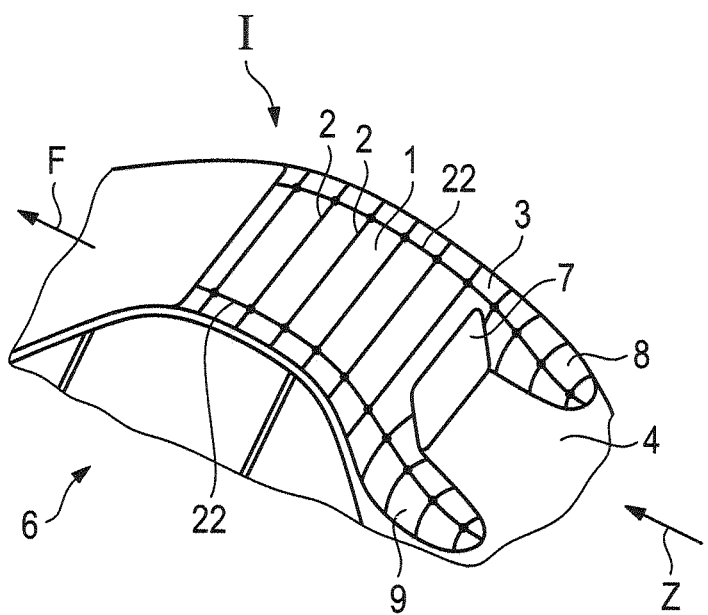
FIG. 1 is a view of a vehicle with a folding top with lateral buttresses, in a closed position.
Figure 2:
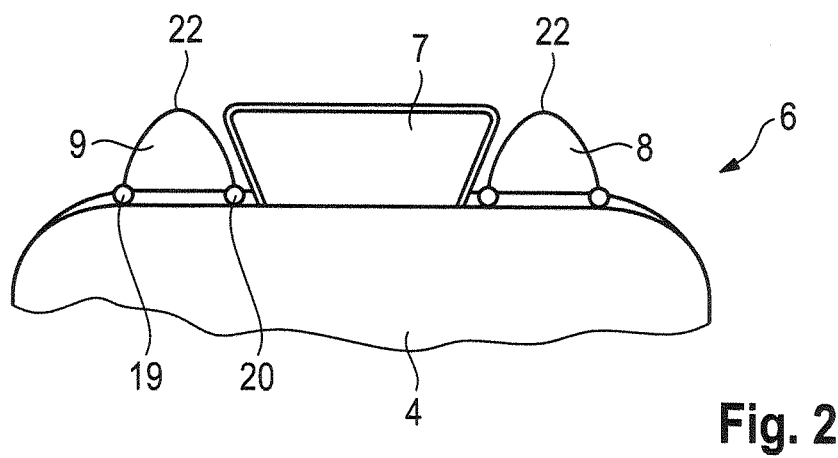
FIG. 2 is a view as seen in the arrow direction Z onto the vehicle according to FIG. 1.

A folding top 1 for a passenger vehicle comprises a folding top linkage or bow 2 and a foldable folding top cloth 3 supported by the folding top bow 2. The folding top 1 is shiftable from a closed position I into a storage position II in which said folding top 1 is accommodated in a receiving space 5 of the vehicle 6. The receiving space 5 is covered by a folding top compartment cover 4.

In the closed position I (FIG. 1), the folding top 1 has raised buttresses 8, 9 that are oriented longitudinally in regions to sides of a rear window 7 and are held by two rearwardly directed—as seen with respect to the direction of travel F—U-shaped bow sections 10, 11 of a transverse tensioning bow 12. The rear window 7 is engaged from above by a bow web 18 that is part of an upright, U-shaped section 17 of the tensioning bow 12. The U-shaped bow sections 10, 11 are held in a lateral cutouts 15 of the folding top compartment cover 4 and have lower sides that bear against a wall 16 of the folding top compartment cover 4. The U-shaped bow sections 10, 11 spread in a V-shaped manner and comprise rods 19, 20 that hold the buttresses 8, 9.

Figure 3:
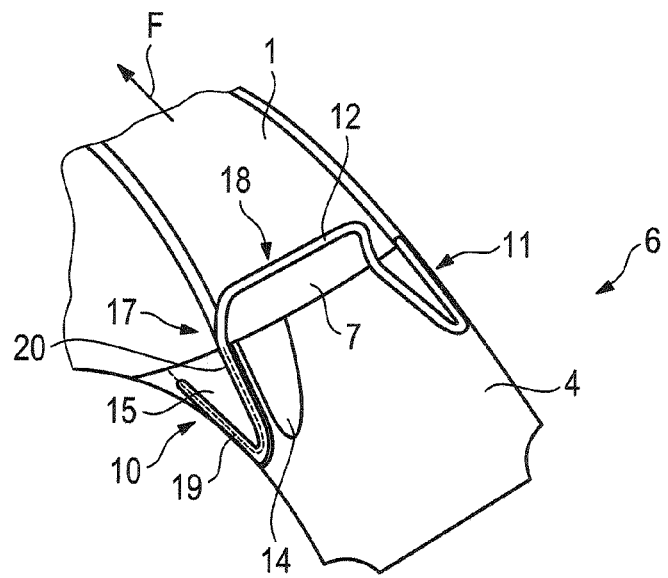
FIG. 3 is a partial view of the vehicle according to FIG. 1 with a tensioning bow for the buttresses.
Figure 4:
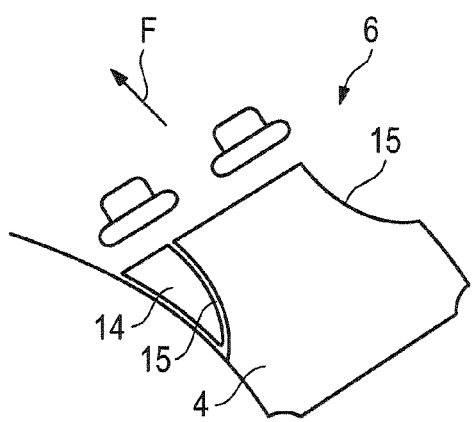
FIG. 4 is a view of a folding top compartment cover of the vehicle with an upwardly pivoted flap for a lateral cutout.
Figure 5:
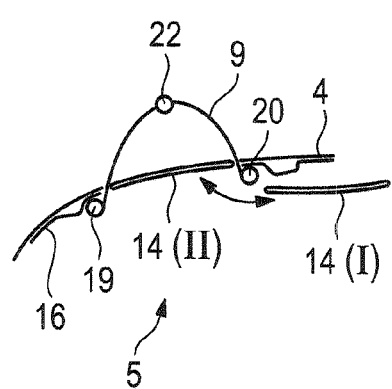
FIG. 5 is a partial view of a buttress with a tensioning bow inserted in the cutout of the folding top compartment cover and with the flap in the storage position and folded away in the closed position.

The lateral cutouts 15 are arranged at both sides of the folding top compartment cover 4 and each cutout 15 has a pivotable flap 14. The flaps 14 are folded away to open the cutouts 15 when the folding top 1 is in the closed position I (FIG. 3). However, the flaps 14 close the cutouts 15 when the folding top 1 is in the storage position II. For example, the flap 14 is shown in the storage position II and folded away in the closed position I in FIG. 5.

Figure 7:
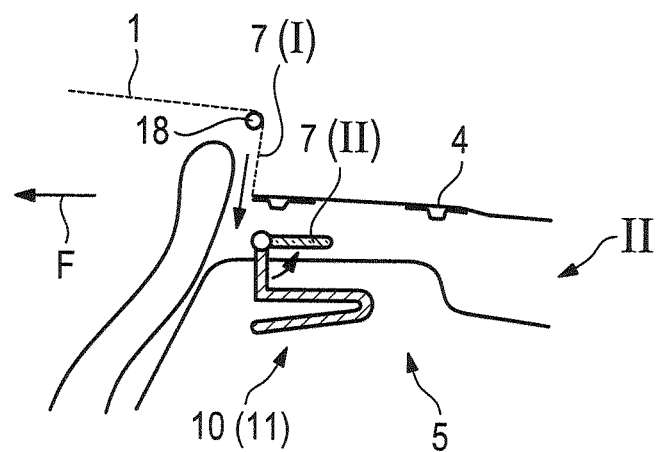
FIG. 7 is a side view of the folding top in the storage position with buttresses, tensioning bow and rear window in the storage space.

The rear window 7 preferably is pivotable or hinged on the transversely extending, upper bow web 18 of the tensioning bow 12 and takes up a horizontal position in the storage position II (FIG. 7).

Figure 6:
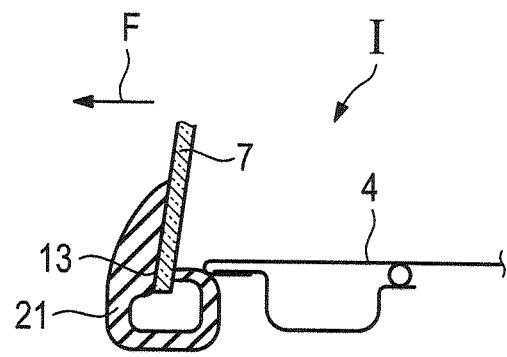
FIG. 6 is a sectional view of the rear window with a lower seal toward the folding top compartment cover.

A seal 21 is provided on the lower edge 13 of the rear window 14 to seal the rear window 7 in the closed position I. The seal 21 is placed in a sealing manner against the folding top compartment cover 4 in the closed position I (FIG. 6).

The folding top cloth 3 of the folding top 1 is fastened to the tensioning bow 12 and can be braced by the buttresses 8, 9 via the U-shaped bow sections 10, 11 of the tensioning bow 12. Bracing cables 22 connected to the buttresses 8, 9 can be provided for shaping purposes.

As illustrated in FIG. 7, the folding top 1 can be lowered from the closed position I into the storage position II, as indicated by the arrow, and can be transferred into the receiving space 5 of the vehicle. For this purpose, the rear window 7 is hinged about the horizontal bow web 18 (FIG. 7) and the lateral cutouts 15 in the folding top compartment cover 4 can be closed via the flaps 14. The operation for taking up the closed position I proceeds in the reverse sequence.

What is claimed is:

1. A folding top for a passenger vehicle with a folding top linkage and a foldable folding top cloth supported by the folding top linkage, the folding top being shiftable between a closed position (I) and a storage position (II) in which the folding top is accommodated in a receiving space of the vehicle, the receiving space being covered by a folding top compartment cover, the folding top, in the closed position (I), having two raised buttresses oriented longitudinally in regions at sides of a rear window and being held by two rearwardly directed U-shaped bow sections of a transverse tensioning bow that engages over the rear window from above by means of an upright, U-shaped section with an upper bow web, and the bow sections being mounted in lateral cutouts of the folding top compartment cover so as to bear on a lower side against a wall.

2. The folding top of claim 1, wherein the lateral cutouts of the folding top compartment cover have pivotable flaps and, in the closed position (I) of the folding top, the cutouts are released and, in the storage position (II) of the folding top, the cutouts are closed by the flaps.

3. The folding top of claim 1, characterized in that the rear window is held pivotably on the upper bow web of the tensioning bow and is aligned substantially horizontally in the storage position (II).

4. The folding top of claim 3, further comprising a sealing element on a lower edge of the rear window for sealing the rear window in relation to the folding top compartment cover when the folding top is in the closed position (I).

5. The folding top of claim 1, wherein the folding top cloth of the folding top is fastened to the tensioning bow and is pretensionable via the U-shaped bow sections of the tensioning bow of the folding top cloth in the region of the buttresses.

6. The folding top of claim 1, wherein the folding top is lowerable from the closed position (I) into the storage position (II) and is transferrable into the receiving space, and the rear window takes up the horizontally hinged-down position and the lateral cutouts of the folding top compartment cover are closable via the flaps.

* * * * *